United States Patent [19]
Yoshikawa et al.

[11] Patent Number: 5,649,442
[45] Date of Patent: Jul. 22, 1997

[54] METHOD OF MANUFACTURING CASING BASE FOR HARD DISC DRIVE DEVICE

[75] Inventors: Hiroshi Yoshikawa; Rikuro Obara, both of Nagano-ken, Japan

[73] Assignee: Minebea Kabushiki-Kaisha, Nagano-ken, Japan

[21] Appl. No.: 553,907

[22] Filed: Nov. 6, 1995

[30] Foreign Application Priority Data

Nov. 28, 1994 [JP] Japan ................... 6-317670

[51] Int. Cl.⁶ .................................................. B21C 23/00
[52] U.S. Cl. ................................................ 72/254; 72/256
[58] Field of Search .................................. 72/253.1, 254, 72/255, 256, 333, 338, 377, 379.2; 29/417

[56] References Cited

U.S. PATENT DOCUMENTS

| | | | |
|---|---|---|---|
| 3,387,481 | 6/1968 | Harvey et al. | 72/256 |
| 4,901,422 | 2/1990 | Woods et al. | 72/254 |
| 5,077,710 | 12/1991 | Gogniat | 72/254 |
| 5,365,650 | 11/1994 | Smith et al. | 72/254 |

FOREIGN PATENT DOCUMENTS

| | | | |
|---|---|---|---|
| 3131155 | 2/1983 | Germany | 72/256 |
| 0107238 | 6/1983 | Japan | 72/254 |
| 0118321 | 5/1989 | Japan | 72/256 |

*Primary Examiner*—Daniel C. Crane
*Assistant Examiner*—Ed Tolan
*Attorney, Agent, or Firm*—Lowe, Price, LeBlanc, & Becker

[57] ABSTRACT

In the manufacture of a casing base for a hard disc drive device, an elongate semi-product of a light metal having a predetermined sectional profile having opposite side frame portions, is extrusion molded and then cut to a predetermined length to obtain an eventual casing base, which is then formed with necessary holes and recessed or raised portions using a press, thus completing the casing base. Like the case of die casting, no cavities are generated, so that it is possible to readily carry out washing and surface treatment. In addition, unlike the case of forming frames in a sole press process, a large number of press forming steps are not involved, and it is possible to permit mass production of a highly accurate and highly rigid product in a small number of steps and at a low cost of manufacture.

6 Claims, 3 Drawing Sheets

METHOD OF MANUFACTURING CASING BASE FOR HARD DISC DRIVE DEVICE

BACKGROUND OF THE INVENTION

1. Field of the Invention

This invention relates to a method of manufacturing a casing base for a hard disc drive device.

2. Description of the Prior Art

FIG. 5 shows an example of casing base for a hard disc drive device manufactured by die casting. This casing base is fabricated in the following steps.

(1) An eventual casing base 11 of aluminum is die cast.

(2) Then, gas such as air remaining in cavities which has fatal adverse effects on the performance of hard disc is removed, and also contaminants due to rusting or like cause are removed.

(3) Further, surface treatment with a chemical or surface coating is made in order to maintain the cleanness of the surface.

(4) Subsequently, the work is machined to correct the shape and dimensions.

(5) Finally, the work is washed to maintain the cleanness.

This process of manufacture has the following demerits.

(a) The process involves a large number of steps from the die casting till the completion.

(b) It is necessary to provide means for avoiding the generation of cavities.

(c) If cavities are generated, washing for removing oil and other contaminants that may get into the cavities can not be readily made, and it is difficult to maintain the cleanness.

Because of the difficulty of maintaining the cleanness, it is necessary to close the cavities by coating or carry out a surface treatment with a chemical to prevent rusting.

(d) A casting die is necessary, which is generally expensive.

(e) This leads to an increased cost of manufacture.

There is another method of manufacture as shown in FIGS. 6 and 7. In this case, an eventual casing base 12 of aluminum is formed with a recessed portion 14 using a press, and then frames 13 which have been press formed in advance are mounted on the opposite sides of the base 12.

This method, unlike the method based on the die casting of aluminum, is free from the problem of cavities and is advantageous from the standpoint of securing the cleanness. This method, however, has the following demerits.

(a) The frames 13 which are press formed in advance, has a very complicated shape, and their fabrication requires a large number of press forming steps.

(b) A step of mounting the frames 13 on the base 12 is necessary, and the mounting position and mounting strength are stringently restricted.

(c) Consequently, a high cost of manufacture is inevitable.

SUMMARY OF THE INVENTION

This invention has an object of providing a method of manufacturing a casing base for a hard disc drive device, which is free from the problems discussed above, can ensure high accuracy, requires a reduced number of steps, and permits reduction of the cost of manufacture.

A basic method of manufacture according to the invention features extrusion molding a semi-product of a light metal, which has a predetermined sectional profile having opposite side frame portions, cutting the semi-product to a predetermined length to obtain an eventual casing base, and forming this eventual casing base with required holes and recessed or raised portions using a press.

The light metal may be aluminum or a light alloy. The holes are for mounting parts and also for wiring, the recessed or raised portions are for mounting various parts.

DESCRIPTION OF THE PREFERRED EMBODIMENT

An embodiment of the invention will now be described with reference to FIGS. 1 to 4.

Figure 1:
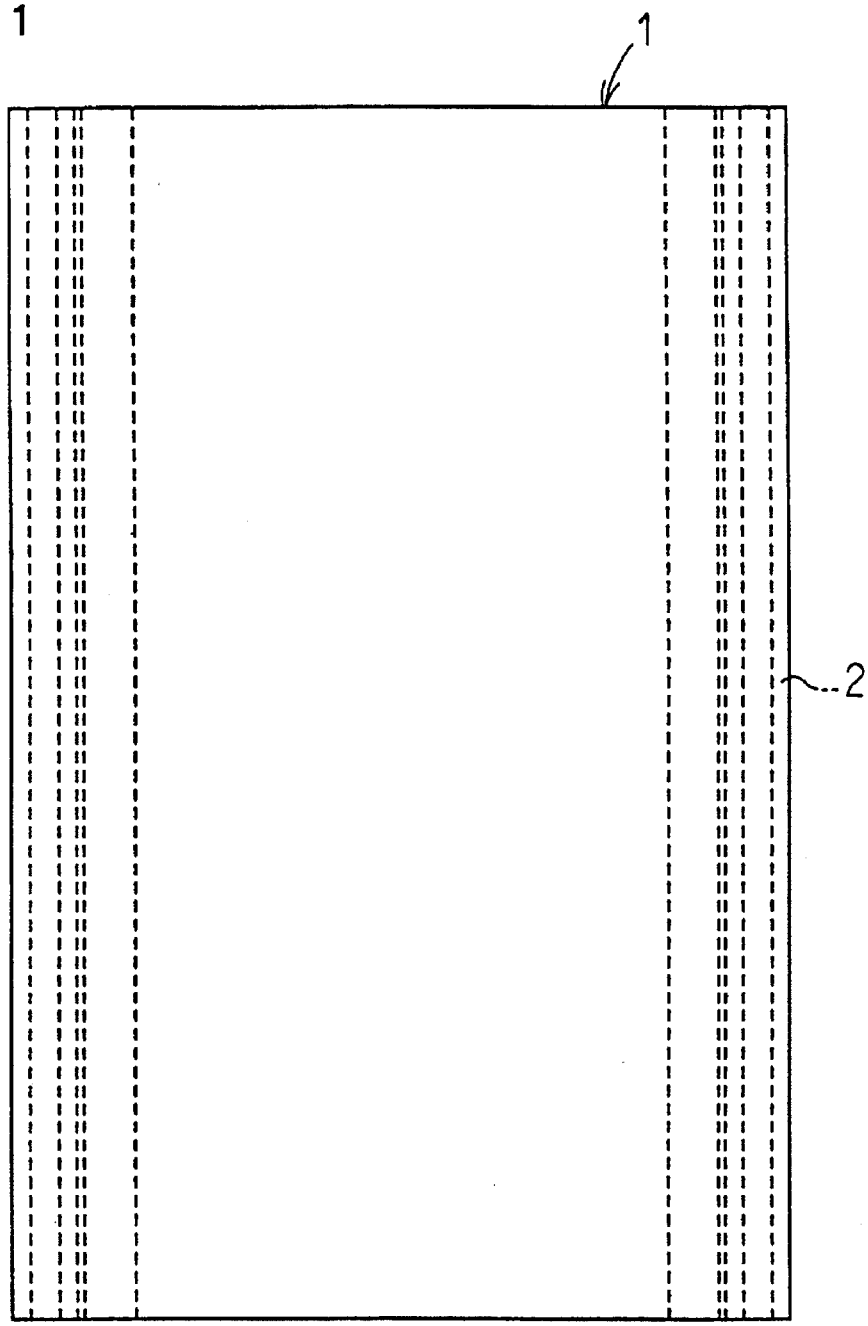
FIG. 1 is a plan view showing an eventual casing base which is extrusion molded in the process according to the invention.
Figure 2:
FIG. 2 is a front view showing the same eventual casing base.

According to the invention, an elongate semi-product of aluminum, for instance, having a predetermined sectional profile having opposite side frame portions 2, is extrusion molded, and this semi-product is cut to a predetermined length to obtain an eventual casing base 1 as shown in FIGS. 1 and 2.

Figure 3:
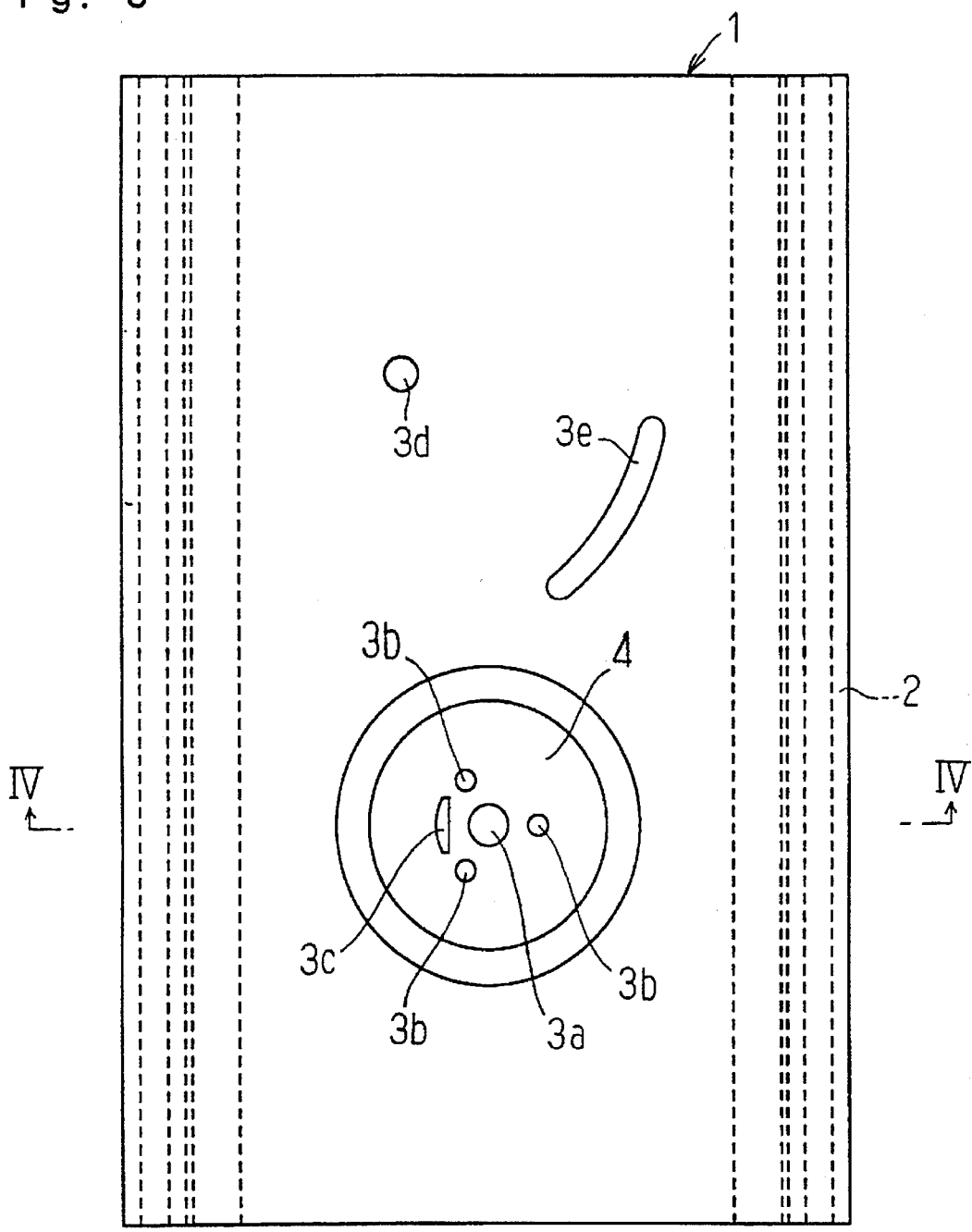
FIG. 3 is a plan view showing the product obtained by processing the eventual casing base with a press.
Figure 4:
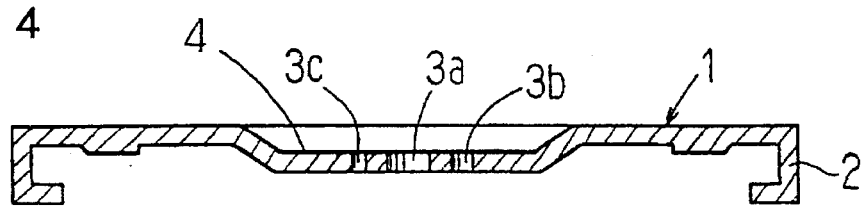
FIG. 4 is a sectional view taken along line IV—IV in FIG. 3.
Figures 5, 6, 7:
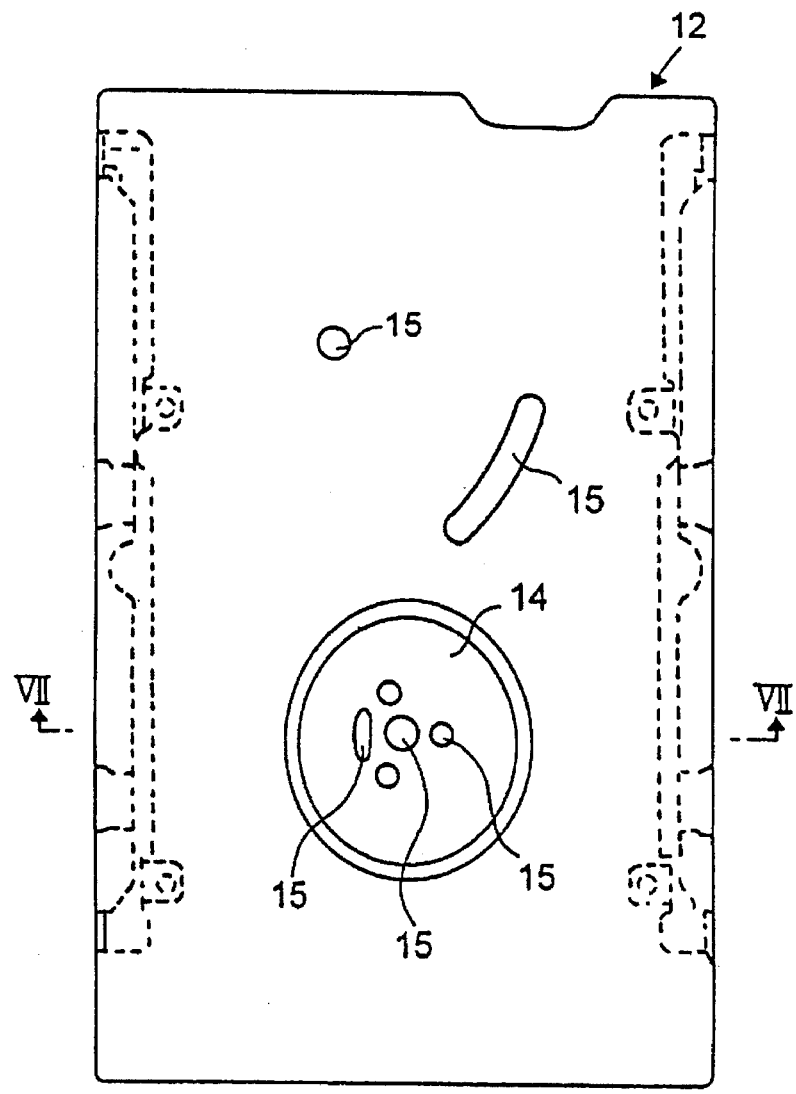
FIG. 5 is a sectional view showing an eventual casing base formed by a prior art die casting process.
FIG. 6 is a plan view showing a prior art casing base formed by using a press.
FIG. 7 is a sectional view taken along line VII—VII in FIG. 6.

This eventual casing base 1 is then formed with various holes 3a to 3e and a recessed portion 4 for setting parts, as shown in FIGS. 3 and 4, by using a press.

Afterwards, if necessary, tapping of the holes 3a to 3e or high accuracy finish machining is made, and sometimes the cut portions are polished.

The recessed portion 4 is for mounting a motor, and its central hole 3a is for mounting the spindle of the motor. The three holes 3b are for passing bolts for securing the motor. The hole 3c is for taking out the leads of the motor. The hole 3d is for mounting a spindle of a pivotal bearing which supports the step of a swing arm having a magnetic head at the free end. The hole 3e is an arcuate hole for guiding a guide pin of the swing arm.

With the method of manufacture according to the invention, in which an elongate semi-product is of aluminum or like light metal is extrusion molded and cut to a predetermined length to obtain an eventual casing base which is then formed with necessary holes and recessed or raised portions using a press, unlike the case of die casting, there is no possibility of generation of cavities, and it is thus possible to permit ready washing and surface treatment of the work.

In addition, unlike the case of press forming frames, the process is free from a large number of press forming steps, and there is no need of a step of mounting such frames. It is thus a feature of the invention that a highly accurate and highly rigid product can be mass produced in a small number of steps and at a low cost of manufacture.

What is claimed is:

1. A method of manufacturing a casing base for a hard disc drive device comprising the steps of:

extrusion molding an elongated aluminum semi-product having a predetermined sectional profile having opposite side frame portions;

cutting the semi-product to a predetermined length to obtain an eventual casing base; and forming the eventual casing base with necessary holes and a recessed portion for mounting a motor of hard disc drive by using a press.

2. The method of manufacturing a casing base for a hard disc drive device according to claim 1, wherein the light metal is aluminum.

3. The method of manufacturing a casing base for a hard disc drive device according to claim 1, comprising the further step of forming the recessed or raised portion for mounting a motor of the hard disc drive device.

4. The method of manufacturing a casing base for a hard disc drive device according to claim 1, comprising the further step of forming the recessed portion with a central hole for mounting a spindle of a motor of the hard disc drive device on the recessed portion.

5. The method of manufacturing a casing base for a hard disc drive device according to claim 1, comprising the further step of forming the eventual casing base with a corner hole for mounting a pivotal spindle supporting a stem of a swing arm for a head of the hard disc drive device.

6. A method of manufacturing a casing base for a hard disc drive device comprising the steps of:

providing a predetermined sectional profile and opposite side frame portions to an elongated aluminum semi-product by extrusion molding;

cutting the semi-product to a predetermined length to obtain an eventual casing base; and forming holes and a recessed portion for mounting a motor of a hard disc drive in the eventual casing base by using a press.

* * * * *